United States Patent [19]

Heflin

[11] Patent Number: 5,572,554
[45] Date of Patent: Nov. 5, 1996

[54] SYNCHRONIZER AND METHOD THEREFOR

[75] Inventor: Daniel L. Heflin, Front Royal, Va.

[73] Assignee: Loral Corporation, New York, N.Y.

[21] Appl. No.: 283,316

[22] Filed: Jul. 29, 1994

[51] Int. Cl.⁶ ....................................................... H04L 7/00
[52] U.S. Cl. ............................. 375/356; 375/357; 375/371
[58] Field of Search ...................................... 375/371, 357, 375/354, 356, 374, 373, 376; 371/3, 1, 4, 5.1, 5.3, 5.4, 47.1, 67.1; 327/141, 144, 150, 160, 162, 163; 331/18, 25

[56] References Cited

U.S. PATENT DOCUMENTS

| | | |
|---|---|---|
| 3,271,688 | 9/1966 | Gschwind et al. . |
| 3,671,776 | 6/1972 | Houston . |
| 3,688,037 | 8/1972 | Ipri . |
| 3,710,274 | 1/1973 | Basse et al. . |
| 3,755,748 | 8/1973 | Carlow et al. . |
| 3,777,063 | 12/1973 | Meacham . |
| 3,878,335 | 4/1975 | Balaban . |
| 3,894,246 | 7/1975 | Torgrim . |
| 3,916,102 | 10/1975 | Merrell . |
| 4,007,329 | 2/1977 | McClain et al. . |
| 4,059,842 | 11/1977 | Meacham . |
| 4,151,485 | 4/1979 | LaFratta . |
| 4,215,430 | 7/1980 | Johnson, Jr. . |
| 4,280,099 | 7/1981 | Rattlingourd . |
| 4,305,045 | 12/1981 | Metz et al. . |
| 4,308,619 | 12/1981 | Hughes . |
| 4,404,680 | 9/1983 | Perkins . |
| 4,504,960 | 3/1985 | Yamada . |
| 4,569,063 | 2/1986 | Perry . |
| 4,604,582 | 8/1986 | Strenkowski et al. . |
| 4,759,040 | 7/1988 | Kawata et al. . |
| 4,760,280 | 7/1988 | Schwefel et al. . |
| 4,837,781 | 6/1989 | Hickling . |
| 4,843,617 | 6/1989 | Marshall et al. . |
| 4,855,615 | 8/1989 | Humpleman . |
| 4,873,491 | 10/1989 | Wilkins . |
| 5,022,056 | 6/1991 | Henderson et al. . |
| 5,036,528 | 7/1991 | Costantino et al. . |
| 5,050,193 | 9/1991 | Ponsard . |
| 5,052,031 | 9/1991 | Molloy . |
| 5,054,039 | 10/1991 | Blackmon et al. . |
| 5,056,118 | 10/1991 | Sun . |
| 5,062,124 | 10/1991 | Hayashi et al. . |
| 5,095,279 | 3/1992 | Quan et al. . |
| 5,120,990 | 6/1992 | Koker . |
| 5,150,068 | 9/1992 | Kawashima et al. . |
| 5,160,894 | 11/1992 | Westwick . |
| 5,164,677 | 11/1992 | Hawkins et al. . |
| 5,220,206 | 6/1993 | Tsang et al. . |
| 5,272,391 | 12/1993 | Ampe et al. . |

FOREIGN PATENT DOCUMENTS

WO92/00558  1/1992  WIPO .

OTHER PUBLICATIONS

Bazes, M., "A Novel Precision MOS Synchronous Delay Line" in *IEEE Journal of Solid–State Circuits*, vol. SC–20, No. 6, Dec. 1985, pp. 1265–1271.

Johnson, M. G. and Hudson, E. L., "A Variable Delay Line PLL for CPU–Coprocessor Synchronization" in *IEEE Journal of Solid–State Circuits*, vol. 23, No. 5, Oct. 1988, pp. 1218–1223.

Primary Examiner—Stephen Chin
Assistant Examiner—Hai H. Phan
Attorney, Agent, or Firm—Stanton D. Weinstein

[57] ABSTRACT

Apparatus and method synchronize one or more digital clock signals from separate oscillators, to another clock oscillator via a common non-continuous signal, and provide error signals to indicate when one or more oscillators are out of tolerance.

12 Claims, 8 Drawing Sheets

SYNCHRONIZER AND METHOD THEREFOR

A portion of the disclosure of this patent document contains material which is subject to copyright protection. The copyright owner has no objection to the facsimile reproduction by anyone of the patent document or the patent disclosure, as it appears in the U.S. Patent and Trademark Office patent files or records, but otherwise reserves all copyright rights whatsoever.

FIELD OF THE INVENTION

The present invention relates generally to digital systems, and more particularly to digital frequency synthesis and to a clock synchronization system for developing one or more clock signals synchronized using a reference signal. The present invention also relates to synchronizers, and more particularly to synchronizers with or having phase displacement, slip or jitter correction. The present invention further relates to oscillators, and more particularly to automatic frequency stabilization of one or more oscillators using a phase or frequency sensing means with a reference oscillator or source. The present invention also relates to phase correction or control systems.

BACKGROUND OF THE INVENTION

There exist applications in which there is a need to generate a single internal clock, or multiple internal clocks, synchronized to a single input clock. The present invention fulfills that need.

Synchronous systems, such as synchronous computing systems, are widely used. In synchronous systems, different components are maintained in a desired phase relationship by an appropriate means. For example, in a synchronous computer, each event, or the performance of each operation, starts as a result of a signal generated by a clock. Provision of such a clock signal to many components may be difficult, especially as the size, complexity or operating frequency of the system increase. For example, integrated circuit components have been interconnected to form complex digital logic systems.

U.S. Pat. No. 4,059,842, issued Nov. 22, 1977 to Meacham, relates to a method and apparatus intended to cause at least approximate phase synchronization to be established between a timing sequence provided by a digital divider chain and a low frequency reference pulse train. A master oscillator apparently drives a digital divider chain (also known as a divide-by-N counter), which apparently constitute a source of timing sequences. The digital divider chain is composed of multiple divide-by-two stages rippled together. A low frequency reference pulse train source and an all-digital phase synchronizer apparently function to bring the timing sequence output of the divider chain into phase synchronism with the output of the source. The synchronizer is a logic circuit intended for resetting the digital divider chain to zero in every cycle of the divider's operation. The reset signal from the synchronizer is apparently generated by a first flip-flop which is reset to its "low" state during presence of a low state reference pulse, and which has the master oscillator pulse train applied to its toggle input. This apparently causes initiation of a reset pulse with either the coincidence of a positive-going transition of the low frequency reference pulse and a negative-going transition of the master oscillator pulse, or if they do not coincide, upon sequential occurrence of a positive-going transition of the low frequency pulse and the next negative-going transition of the master oscillator pulse. A second flip-flop is intended to be suitably connected to control the first flip-flop to prevent further changes to a "high" state until appearance of the next "low" state of the low frequency pulse which holds the first flip-flop at its "low" state. In other words, the two flip-flops are intended to be suitably connected to cause the first flip-flop to change to a "high" state in response to a master oscillator pulse at a predetermined portion of the low frequency reference pulse cycle. Any other changing to a "high" state of the first flip-flop is described as being prevented by a combination of presence of the "low" state of the low frequency pulse train and a latching effect produced by suitable connection of the second flip-flop. The all-digital phase synchronizer is described as being used to generate a reset pulse to the digital divider chain.

The low frequency reference signal of Meacham is described as continuous and related to the master oscillator output by the divisor of the digital divider chain. Thus, temporary loss of the low frequency reference signal could cause an erroneous result in the Meacham system. Also, Meacham provides no means to prevent noise from accidentally falsely triggering the reset circuit of the synchronizer. Meacham furthermore provides no means to indicate an oscillator tolerance fault, and from the use of the low frequency reference signal is apparently used to reset at low frequencies. This last limitation also imposes a limit on the accuracy of the phase synchronizer. With a sufficiently high oscillator clock frequency, the delay in ripple stages of the divider chain would be longer than the clock period, causing a complete failure of the Meacham apparatus.

U.S. Pat. No. 5,160,894, issued Nov. 3, 1992 to Westwick, appears to disclose a frequency synthesizer circuit having a counter, a latch/decoder, a programmable divider, and a wave shaper which together synthesize an output clock signal X. System clock signals M and N are each apparently provided to the counter and to the divider; clock signal M is also apparently provided to the latch/decoder. The counter apparently counts the number of system clock signal N periods that occur within one system clock signal M period; this count is apparently stored as a count value. The stored count value is apparently latched or decoded by the latch/decoder to produce a divisor which is apparently output from the latch/decoder to the divider. The divider apparently divides the clock signal N frequency by this divisor to provide what is described as a spiked waveform to the wave shaper. The wave shaper apparently alters the frequency and the duty cycle of the spiked waveform to produce the output clock signal X.

However, Westwick can produce only a single clock output signal X; if additional clock output signals are needed, then an additional such system is needed for each additional clock output signal desired. Also, each such system would produce a single fixed clock frequency output; the system must be modified, or the value of clock signal N must be changed, in order to produce other clock output signals. Even then, each such system would still produce only one clock output signal at any one time. Also, a certain relationship between clock signal M and clock signal N is needed to obtain the particular desired characteristics of output clock signal X. Also, clock signals M and N must be continuously produced, in order for the output clock signal X to be continuously produced. Also, Westwick will fail to provide a correct frequency output if clock signal M varies because the system depends on the stability of clock signal M to correct variances in clock signal N. Furthermore, no indication of error is provided in the event of a system or clock signal M or N failure.

SUMMARY OF THE INVENTION

Accordingly, an object of the present invention is to provide apparatus and method capable of generating one or more periodic signals.

Another object of the present invention is to provide apparatus and method capable of synchronizing one or more digital clock signals, generated on one or more separate modules, using another clock oscillator, each such module having one or more oscillators.

A further object of the present invention is to provide apparatus and method capable of synchronizing one or more digital clock signals, on one or more separate modules, using another clock oscillator via a common noncontinuous signal, each such module having one or more oscillators.

Still another object of the present invention is to provide apparatus and method utilizing a non-continuous signal as a synchronization signal.

Yet another object of the present invention is to provide apparatus and method capable of indicating whether the frequency of one or more oscillators, and/or the synchronization of one or more digital clock signals, is out of a preset tolerance.

A still further object of the present invention is to provide synchronization apparatus and method requiring fewer components and providing predictable, higher accuracy of synchronization.

Still another object of the present invention is to provide apparatus and method capable of synchronizing and synthesizing multiple related output clocks.

Yet another object of the present invention is to provide apparatus and method using a synchronizing pulse that is non-continuous such that the period and duty cycle of the synchronizing pulse can vary greatly without affecting operation of such apparatus and method.

A still further object of the present invention is to provide apparatus and method capable of preventing a noise pulse from being misinterpreted as a real synchronization pulse.

Briefly, these and other objects of the present invention are accomplished by apparatus and method that synchronize one or more digital clock signals from separate oscillators, using another clock oscillator via a common non-continuous signal. Error signal(s) are provided as needed to indicate when one or more of the separate oscillators are out of tolerance.

A synchronizing signal is generated on a first module whose output is commonly connected to all modules to be thereby synchronized. The synchronizing signal is a pulse that is caused by a clock located on the first module. This signal may be gated but the state change of the synchronizing edge of this signal must be caused by the clock, not the gating. The synchronizing edge of the synchronizing signal can be chosen to be either the rising edge or the falling edge. An inverter may be used in the latter case at the sync input line for each module. Each module to be synchronized includes at least one oscillator clock having a period related to that of the clock of the first module, a pulse limiter receiving both the synchronizing signal and the local oscillator clock signal, a counter/clock divider controlled by the output of the pulse limiter to receive the output of the local oscillator clock and producing one or more clock output signals synchronized by the synchronizing signal, and an error comparer controlled by the output of the pulse limiter to determine whether the synchronization of the clock signal(s) produced by the counter/clock divider exceeds a preset permitted tolerance range. If so, then the error comparer produces a clock error signal indicative thereof. A pulse width filter can be applied to the synchronizing signal before it is provided to the pulse limiter in order to filter out noise spikes (if present). Presence of a synchronizing edge on the synchronizing signal causes the pulse limiter on each synchronized module to synchronously load with a preset fixed value, reset or clear (as appropriate) the counter/clock divider to some fixed output value A in order to maintain synchronization, with the clock on the first module, of the output clock signal(s) produced by the counter/clock divider.

Other objects, advantages and novel features of the invention will become apparent from the following detailed description of the invention when considered in conjunction with the accompanying drawings.

DESCRIPTION OF THE PREFERRED EMBODIMENT

Figure 1:
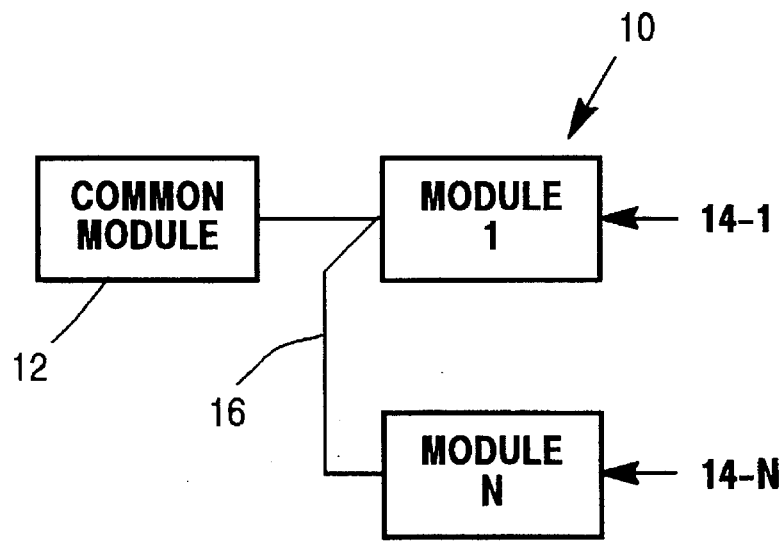
FIG. 1 is a block diagram of one embodiment of a synchronized multiple clock output system according to the present invention.

Referring now to the drawings, wherein like reference characters designate like or corresponding parts throughout the several views, there is shown in FIG. 1 a synchronous system 10 including a common module 12 connected to one or more modules 14-1, 14-2, ..., 14-N to provide thereto a synchronization system. System 10 synchronizes one or more digital clock signals from one or more separate oscillators to another, master clock oscillator on common module 12 via a common non-continuous signal, and provides error signal(s) to indicate when one or more such oscillators are out of tolerance. In system 10, apparatus and method are provided for synchronizing clocks on one or more modules 14-1, 14-2, ..., 14-N using a synchronizing signal passed from common module 12 to all modules 14-i to be synchronized. This synchronizing signal is generated on common module 12, which is commonly connected to all modules to be synchronized 14. The output of common module 12 can be connected to one or more modules 14-i via a line, bus or other connection 16. Connection 16 may for example be a parallel connection, or on a suitable bus. Connection 16 must be such that the signal arrival from common module 12 to synchronize the synchronized modules 14-i is well within acceptable synchronization error. The synchronization signal produced by con, non module 12 is preferably a pulse that is caused by a clock 42 (FIG. 3) with a period related to $T_{MIN}$, with accuracy of at least $T_{OXM}$, on common module 12. In the example given below, the period of clock 42 is equal to Tom for simplicity, but this is not required for practice of the present invention. This synchronizing signal may be gated, but the state change (of the synchronizing edge) of the synchronizing signal is to be caused by the clock, not by the gating signals. The pulse width of the synchronizing signal may vary, but must meet a minimum pulse width $P_{WMIN}$. The time between pulses may also vary but must be between $T_{MAX}$ and $T_{MIN}$. This synchronization signal may be a dedicated signal just for synchronization, or it may be an appropriately chosen existing signal, since any signal that meets the foregoing requirements may be used as the synchronization signal. Because of the flexibility allowed by the present invention in the synchronization signal, most applications will likely not require a dedicated signal for synchronization, but instead can use an existing signal as the synchronization signal. The synchronizing signal must meet the following formula: $XT_{MIN}$ is less than or equal to $T_{MAX}$ where X is an integer but can continuously vary based on or gated from $T_{MIN}$. Integer X can change with each synchronization pulse or cycle.

Figure 2:
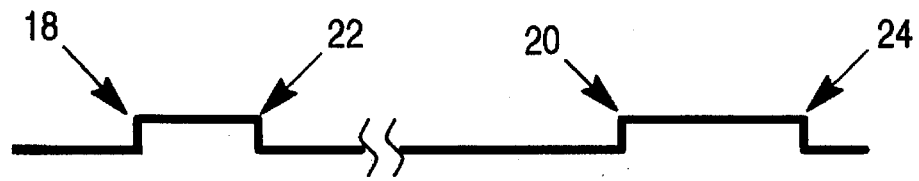
FIG. 2 is a waveform timing diagram of one example of a synchronizing signal that can be utilized in the system of FIG. 1.

A preferred synchronization signal is illustrated in FIG. 2. The synchronizing edge of the synchronizing signal can be chosen to be either the rising edge 18 and 20 or the falling edge 22 and 24.

The pulse width measured from rising edge 18 to falling edge 22, or rising edge 20 to falling edge 24, of FIG. 2 may continuously vary but must not be lower than $P_{WMIN}$. The time between pulses measured from edge 18 to edge 20 in FIG. 2 for the rising edge example may also continuously vary based upon the previous formula $$T_{MIN} \leq (XT_{MIN}=T) \leq T_{MAX}$$

Figure 4:
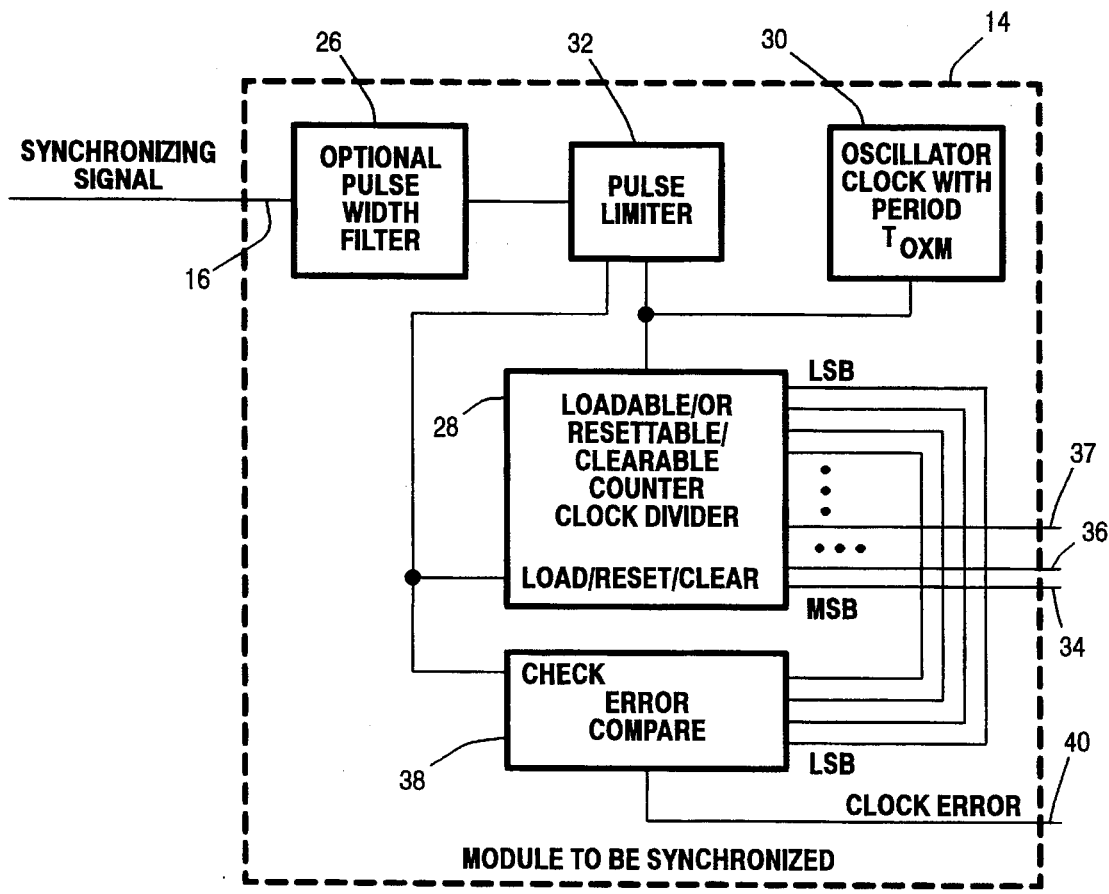
FIG. 4 is a block diagram of one embodiment of any or each of the synchronized modules of FIG. 1.

In each synchronized module 14, many of the components used in synchronization are already needed in order to generate the clock being synchronized. The oscillator clock 30 output is divided by the counter/clock divider 28 to generate the needed clock signal(s). Therefore, the components required for the respective functions of oscillator clock 30 and counter/clock divider 28 are used both in clock generation and clock synchronization. For proper operation at high clock speeds, it is preferred that the counter/clock divider 28 be synchronous, with synchronous load or synchronous reset or synchronous clear or any combination thereof. The synchronizing signal is provided from con, non module 12 to each synchronized module 14 via bus or line(s) or other connection 16. The synchronizing signal from common module 12 as applied to a synchronized module 14 would first be applied to pulse limiter 32, or, if present, to optional pulse width filter 26. Pulse width filter 26, if present, passes only pulses that are longer than (or longer than or equal to) its filter period $T_{FILTER}$. This prevents noise spikes from driving the synchronization circuit on module 14. Although only one synchronized module 14 is illustrated in FIG. 4 and in FIG. 4A, it is to be understood that each synchronized module 14-i (e.g. 14-1, 14-2, ..., 14-N) of FIG. 1 corresponds thereto. The signal from the pulse width filter 26 (if present) or from line 16 (if filter 26 is not present) goes to pulse limiter 32. Pulse limiter 32 limits the duration of the synchronization pulse to one clock cycle of the local oscillator clock 30 on synchronized module 14. Local oscillator clocks 30 has a period of $T_{OXM}$, which may vary from synchronized module to synchronized module. Accordingly, pulse limiter 32 also receives the clock signal produced by local oscillator clock 30. This output from pulse limiter 32 is used with the output of oscillator clock 30 to synchronously load, reset or clear the counter/divider 28 to some fixed output value A. Value A can, for example, be zero. The output from oscillator clock 30 is provided to the clock input of counter/clock divider 28, and the output of pulse limiter 32 is provided to the control input of counter/clock divider 28 for load, reset or clear. Thus, a synchronizing edge provided by common module 12 causes load, reset or clear of counter/clock divider 28. The bit width of the counter/clock divider 28 is based on the required frequency(ies) of the output clock signal(s) to be generated, and on the frequency of local oscillator clock 30. The Most Significant Bit (MSB) output 34 of the counter/clock divider 28 is the slowest output clock signal of module 14 to be directly synchronized by system 10, and has a period of at least $T_{ML}$. Additional still slower output clock signals may, but need not, be generated by the other output clock signals. These slower signals remain synchronized indirectly because the signals they are generated by are synchronized. There can, but need not, be one or more higher frequency clock output signal(s) (e.g. additional clock outputs 36 and 37) synchronized up to the frequency where the output clock period remains greater than 2 times $T_{ERRORMAX}$.

Counter/clock divider 28 is resynchronized by the synchronization pulse from common module 12 before the synchronized clock outputs 34, 36, 37, etc. of one or more modules to be synchronized 14 can become out of synchronization more than the maximum allowable synchronization error of $T_{ERRORMAX}$. If an oscillator clock 30 becomes out of tolerance and the resulting synchronized clock output(s) become out of synchronization more than $T_{ERRORMAX}$, the condition is detected by error compare or tolerance error detector 38 so that its clock error output 40 becomes active. This desynchronization error is detected by the error compare component 38 which tests the outputs of the counter/clock divider 28 just before the counter/clock divider 28 is resynchronized by common module 12. Error compare 38 tests the outputs of counter/clock divider 28 to determine if, at the resynchronization time, those outputs are within the range allowed by $T_{ERRORMAX}$. This testing by error compare 38 is accomplished by comparing the outputs of counter/clock divider 28 with values which correspond to C (the resynchronization output value of counter/clock divider 28) plus or minus D (the count equal to $T_{ERRORMAX}/T_{OXM}$ rounded down). This value C plus or minus D is rounded because an integer is needed for a count. This value C plus or minus D is rounded down because a value rounded up would be out of tolerance. Error compare 38 can be simplified if the resynchronization value C equals zero because then an absolute value compare for D can be used as error compare 38. The fault isolation capability of system 10 is dependent upon the number N of modules to be synchronized 14 within the individual configuration of system 10. For example, if a large number of modules 14 are to be synchronized, and if the clock error signal from error compare 38 is active on one module 14-i, then it is very likely that the oscillator clock 30 or the counter/clock divider 28 of that module 14-i is the source of the fault. However, if all N modules have clock errors simultaneously, then it is very likely that the oscillator clock 42 on common module 12 is the source of the fault.

For the further understanding of the present invention, the following expressions, utilized in the following illustrative example, will now be defined.

$P_{WMIN}=(T_{OXM}+T_{CNTRSETUP})$ without pulse width filter. or else $P_{WMIN}=(T_{OXM}-T_{FILTER})$ with pulse width filter.

$T_{MIN}=T_{ML}$, the period of the lowest frequency clock to be synchronized.

$T_{FILTER}$ is a selectable design variable based upon noise environment and is limited by the $P_W$ selected (or available)

$T_{OXM}$ is a design parameter.

$T_{ERRORMAX}$ is the maximum allowable error and is a design parameter.

$S_{OXM}$ is the frequency tolerance of the oscillator as published in the oscillator manufacturer's specifications.

The synchronizing signal must meet the following formula:

$$X\ T_{MIN} \leq T_{MAX}$$

where X is an integer but can continuously vary. X can change with each synchronization pulse or cycle.

Figure 3:
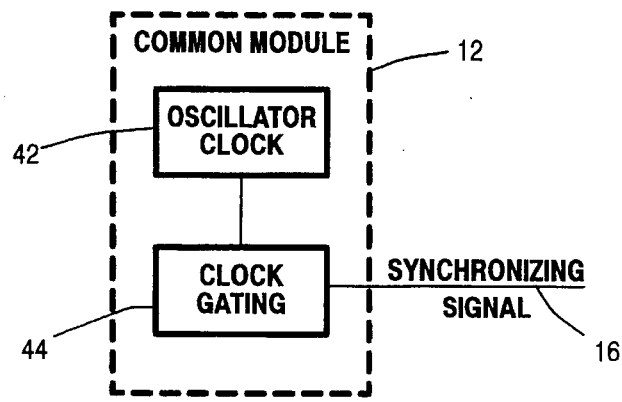
FIG. 3 is a block diagram of the common module of FIG. 1 producing the synchronizing signal of FIG. 2, shown in greater detail.

As one illustrative example of implementation and operation of the embodiment of system 10 illustrated in FIGS. 3 and 4, let the clock frequency of both the oscillator clock 42 of common module 12 and the oscillator clock 30 of each module to be synchronized 14, be 32 MHz, so that $T_{omx}$ equals 32 MHz. As shown in FIG. 3, the common module 12 oscillator clock 42 is gated with gating circuitry 44. The gating provided by clock gating 44 produces a synchronizing signal on line(s), bus or other connection 16 with the following characteristics, where $T_{omx}$=32 MHz. Pulse width $P_W$ of the synchronizing signal produced by common module 12 in this example is then fixed at 188 ns and the time between pulses varies between a minimum of 2.25 microseconds and a maximum of 414 microseconds, according to $T=XT_{ML}=X$ (750 ns) where X is an integer less than or equal to 552 and greater than or equal to 3. The frequency tolerance $S_{OXM}$ of oscillator clock 30 (and of oscillator clock 42) for the manufacturer's specifications on the oscillator selected for this example is 100 parts per million. Thus, $T_{MAX}=(T_{ERRORMAX} \times 10^6)/2S_{OXM}=(94.5$ ns$\times 10^6)/200=$ 0.4725 ms. Therefore, the synchronization pulses produced by common module 12 will occur at intervals no greater than, and preferably well within, $T_{MAX}$, which here is equal to 0.4725 ms which is greater than 414 microseconds. On any one module 14 to be synchronized, for this example let the clock outputs to be synchronized 34, 36 and 37 be respectively 1.33 MHz, 2.66 MHz and 5.33MHz. For this example, because 1.33 MHz is the lowest frequency to be synchronized, therefore $T_{ML}$=750 ns. Since $T_{MIN}=T_{ML}$, therefore $T_{MIN}$=750 ns. In this example, the minimum time between pulses is 2.25 microseconds which is greater than $T_{MIN}$. In this example, a pulse width filter 26 is provided whose filter constant is selected to be 94.5 ns. Filter 26 thus will pass pulses longer than 94.5 ns, so that $T_{FILTER}$ equals 94.5 ns. Thus, the minimum pulse width $P_{WMIN}$ equals $T_{OXM}+T_{FILTER}$ equals 31.5 ns+94.5 ns equals 126 ns. As stated above, the pulse width $P_W$ of the synchronizing pulse produced by common module 12 in this example is fixed at 188 ns, so that $P_{WMIN}$ is exceeded. Also, the filter 26 constant could be selected to be longer if needed. All of the above conditions for a proper synchronizing signal are therefore met. T varies between 2.25 microseconds and 414 microseconds. $T_{MIN}$=750 ns which is less than T. $T_{MAX}$= 0.4725 ms which is greater than 414 microseconds. $P_W$ is now greater than $P_{MIN}$. The highest output clock frequency to be synchronized is 5.33 MHz and has a period of 189 ns. Twice $T_{ERRORMAX}=2 \times 94.5$ ns =189 ns; having this value equal to the shortest output clock signal period to be synchronized is acceptable. If the highest output clock frequency to be synchronized had had a period less than $2T_{ERRORMAX}$, and if that output signal had been more than 50% off, one or more of its cycles could be lost at synchronization. The 188 ns synchronizing pulse produced by common module 12 passes through pulse width filter 26 and then through pulse limiter 32. Pulse limiter 32 limits the resynchronization pulse length that it produces on its output 33 to one clock cycle of oscillator clock 30. The resynchronization pulse from pulse limiter 32 loads a value of, for example, zero into the counter/clock divider 28. Counter/clock divider 28 continues to count, clocked by oscillator clock 30. The synchronized clock outputs 34, 36, and 37 have then been synchronized on each module to be synchronized 14 to within $T_{OXM}$ which in this example is much less than $T_{ERRORMAX}$. Since 31.5 ns is less than 94.5 ns, $T_{OXM}$ is less than $T_{ERRORMAX}$. At the time of resynchronization, the value at each output of counter/divider 28 is compared, in error compare 38, to a value of plus or minus 3 which is one-half of the divisor of the 5.33 MHz clock output 37 and equal to $T_{ERRORMAX}$. If any counter/divider 28 output value is found to be greater than 3, then error compare 38 sets its clock error output 40 active, indicating an oscillator clock 30 or 42 is out of tolerance enough to exceed $T_{ERRORMAX}$. In this example, if the oscillator clocks 30 and 42 are within the tolerance specified above, then the synchronization error never exceeds $T_{OXM}$ or 31.5 ns. Therefore, if desired, $T_{ERROMAX}$ could be chosen to be as small as 31.5 ns in this example.

In this example, even though the synchronizing signal can vary widely anywhere from 2.25 microseconds to 414 microseconds, the modules to be synchronized 14 can be synchronized to within 31.5 ns of each other.

Figure 5A:
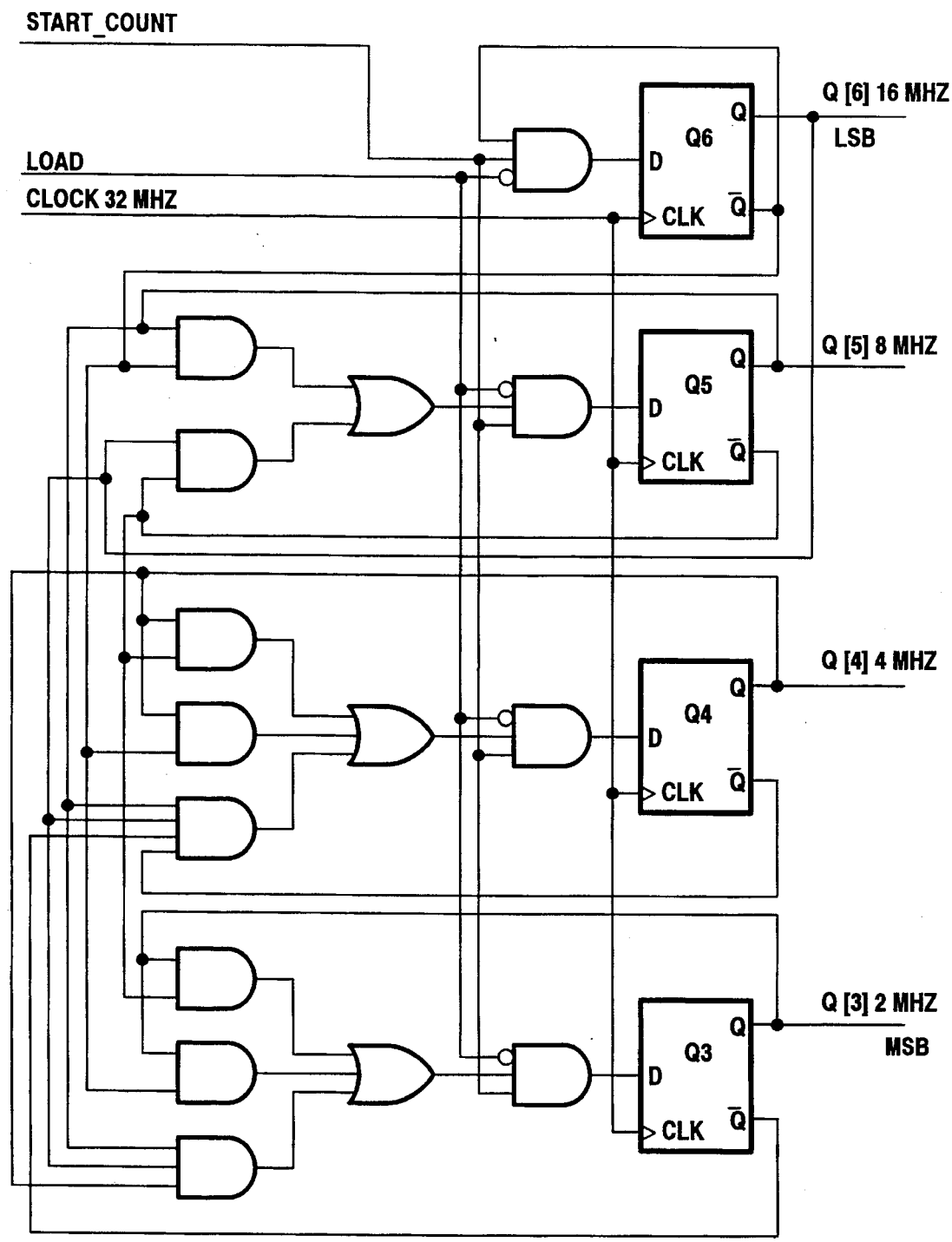
FIG. 5A and FIG. 5B together is a schematic diagram of one embodiment of a counter/clock divider for the synchronized module of FIG. 4, showing one illustrative example of a local clock input frequency and resulting clock output frequencies.
Figure 5B:
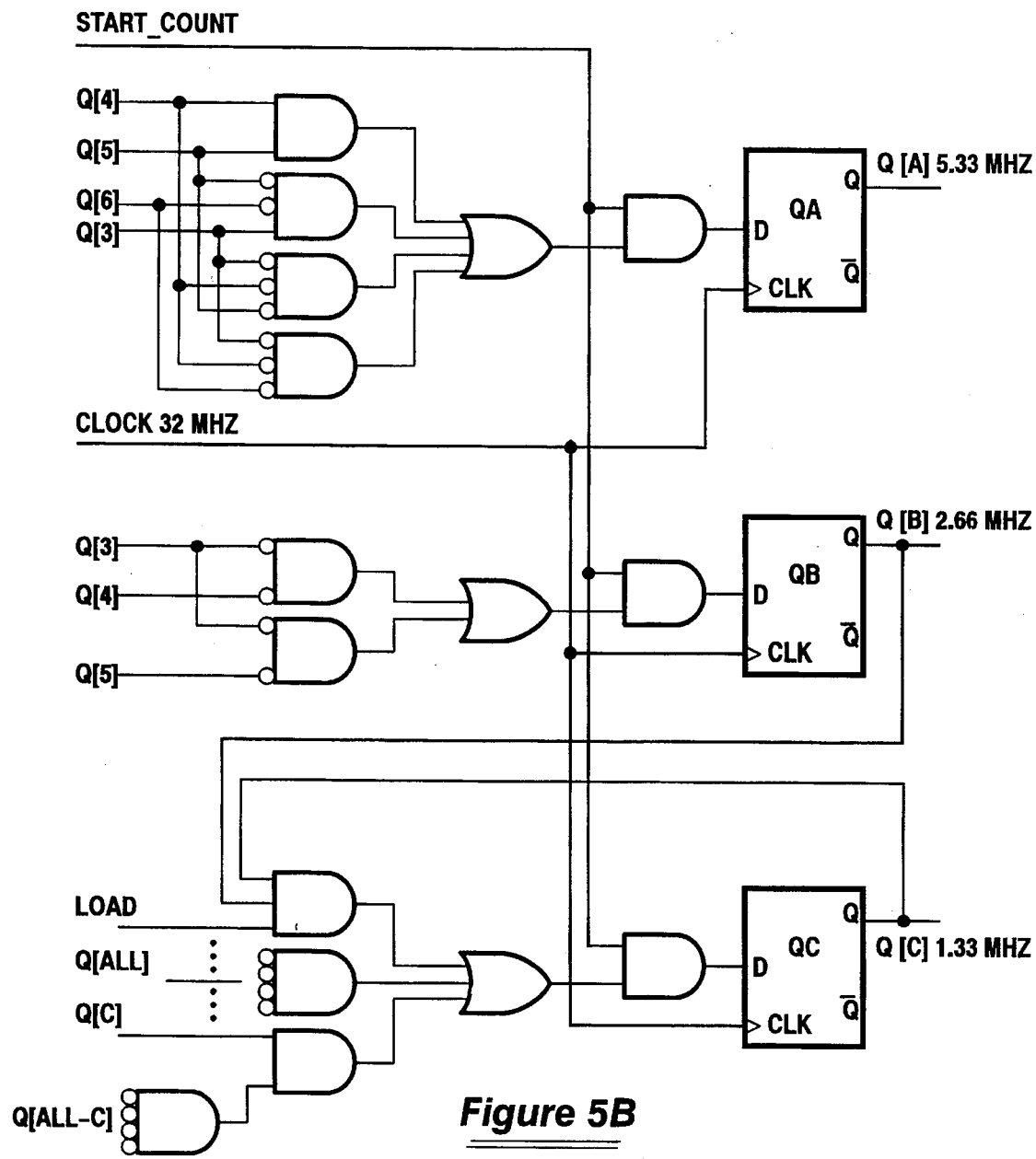
Figure 6:
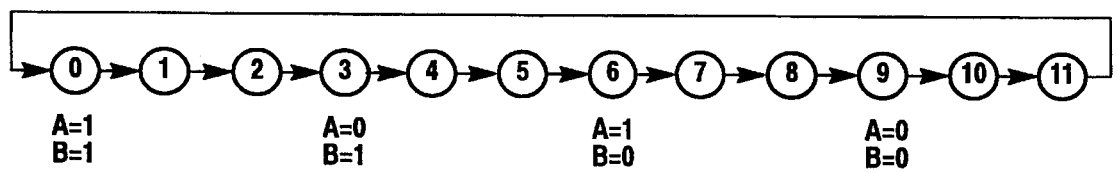
FIG. 6 illustrates a sequence of operation of the counter/divider of FIGS. 5A and 5B.

FIGS. 5A and 5B together show one embodiment of counter/divider 28. The four outputs Q[3], Q[4], Q[5] and Q[6] of FIG. 5A are respectively connected to the correspondingly identified inputs of FIG. 5B. Alternatively, any standard synchronous counter could be utilized as counter/divider 28. The counter/divider of FIGS. 5A and 5B performs the count from decimal 0 (binary 0000) to decimal 11 (binary 1011) shown in Table 1, repeating with the count value of decimal 0 (binary 0000) et seq. after the count value of decimal 11 (binary 1011) is reached, to perform the count from decimal 0 to decimal 11 and then start back at decimal 0, as shown in Table 1.

TABLE 1

Count is:

| Binary | | Decimal |
|---|---|---|
| 0000 | = | 0 |
| 0001 | = | 1 |
| 0010 | = | 2 |
| 0011 | = | 3 |
| 0100 | = | 4 |
| 0101 | = | 5 |
| 0110 | = | 6 |
| 0111 | = | 7 |
| 1000 | = | 8 |
| 1001 | = | 9 |
| 1010 | = | 10 |
| 1011 | = | 11 |
| | Then Repeats | |

An additional feature of this counter of FIGS. 5A and 5B that can be provided is a START$_{13}$COUNT input which allows the entire counter to be started or stopped externally. Ordinarily, a standard synchronous counter would do a 16 count from decimal 0 to decimal 15 (binary 1111). Therefore, to perform a count from decimal 0 to decimal 11 there would be needed some additional gating to start the count over after count value 11 if a standard synchronous counter is to be used for this purpose. In other words, gating would be added to a standard synchronous counter to start it over at decimal 12 instead of at decimal 16. However, it should be understood that the present invention is not limited to a counter that counts from decimal 0 to decimal 11 and then back to decimal 0. In FIG. 5B, the input of Q[ALL] represents an input in parallel of Q[3], Q[4], Q[5], Q[6], Q[A], Q[B] and Q[C], while input Q[ALL-C] is all of these except for Q[C]. The value of C will depend on previous states of Q[A], Q[B], and Q[C]. For the present example, these values should respectively reflect clock signals of 5.33 MHz, 2.66 MHz and 1.33 MHz. It takes 6 counts to get through a cycle of A, 12 counts to get through a cycle of B, and 24 counts to get through a cycle of C. This is because C depends on two additional factors of the previous states of Q[A] and Q[B] as well as the previous state of Q[C]. For the 32 megahertz clock of the present example, it takes 6 cycles of that clock to produce one cycle of the 5.33 MHz clock of Q[A], 12 cycles of the 32 MHz clock to produce one cycle of the 2.66 Mhz clock of Q[B], and 24 cycles of the 32 Mhz clock to make one cycle of the 1.33 Mhz clock of Q[C]. In FIGS. 5A and 5B, each Q represents a flip-flop output. The counter of FIGS. 5A and 5B is particularly structured to provide frequencies that are not standard divide -by- 2 frequencies, resulting in a somewhat more complex counter design than would otherwise be needed. However, the present invention will work equally as well with output clock values that happen to be divide -by- two values for the local oscillator clock 30. Accordingly, the present invention can work with other counters/dividers (e.g. other counters and other dividers) other than the specific counter/divider shown in FIGS. 5A and 5B. The particular design of the counter/divider used will depend on the desired output frequencies. For example, to produce a 1 MHz output clock, an additional divide -by- two stage would be added to the configuration of FIG. 5A to produce a new MSB output of Q[2] at 1 MHz. The exact frequencies produced by counter/divider 28 depend on what the user's particular requirements are for the system, and therefore the selection and configuration of the counter is dependent on what the user's requirements are for the particular system being used.

Figure 7:
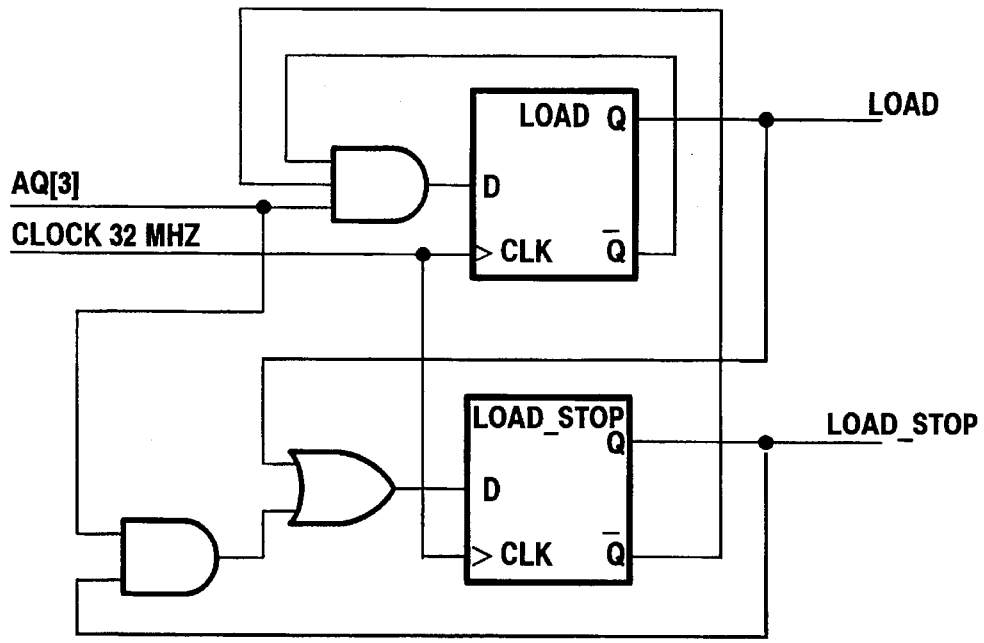
FIG. 7 is a schematic diagram of one embodiment of a pulse limiter for the synchronized module of FIG. 4.

FIG. 7 shows one configuration of pulse limiter 32. Pulse limiter 32 limits the length of a pulse on output line LOAD from the period of the signal on input line AQ[3] to the period of clock 30. In the example described above where oscillator clock 30 has a period of 32 MHz, the period on the clock input line to pulse limiter 32 is 31.5 ns which is the period of a 32 MHz clock signal. The purpose of pulse limiter 32 is to limit the length of the load pulse which is used for resynchronizing the count on counter/divider 28 and to limit that load function to one cycle of oscillator clock 30. Pulse limiter 32 limits the length of each output pulse from counter/divider 28 to one cycle $T_{OXM}$ of oscillator clock 30 in order to ensure that the output of counter/divider 28 remains synchronized with clock 30. If an output pulse from pulse limiter 32 would be allowed to extend beyond one clock 30 cycle $T_{OXM}$, then the count sequence of counter/divider 28 would be delayed and so would not stay synchronized. The pulse limiter of FIG. 7 operates in the following manner. When the control pulse on pulse limiter output line LOAD begins, following the next clock 30 cycle, pulse limiter output line LOAD$_{13}$STOP comes on or becomes active to cut off the output pulse from pulse limiter so that the output pulse on pulse limiter 32 output line LOAD will only go for 1 clock 30 cycle. The pulse limiter will not allow output line LOAD to go back up until its input line AQ[3] goes low or inactive, that is, until the synchronization pulse from common module 12 goes away. Pulse limiter input line AQ[3] is provided from pulse width filter 26, or if filter 26 is not used, then it is provided directly from connection 16.

Figure 8:
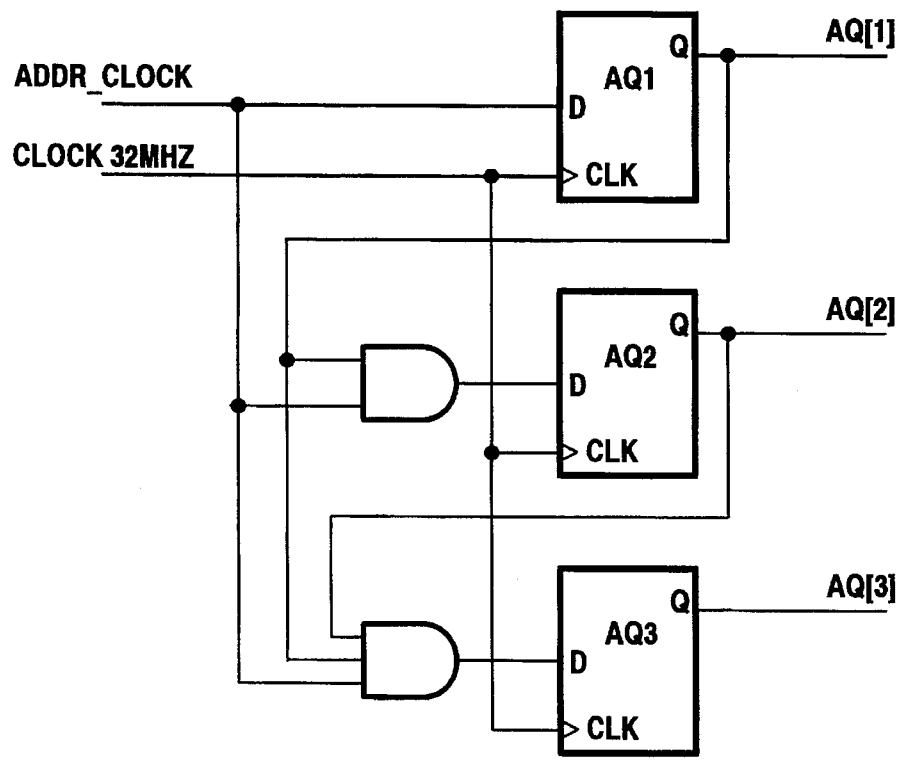
FIG. 8 is a schematic diagram of one embodiment of a pulse width filter for the synchronized module of FIG. 4.

FIG. 8 illustrates one embodiment of pulse width filter 26. As discussed above, preferably filter 26 output line AQ[3], with the clock 30 output, are the inputs to the embodiment of pulse limiter 32 shown in FIG. 7. The synchronization pulse from common module 12 and connection 16 appears as an input to filter 26 on line ADDR$_{13}$CLOCK. Pulse width filter 26 takes the synchronization pulse from common module 12, and ensures that it is at least 3 clock cycles long before it is passed through to output line AQ[3] to be provided to pulse limiter 32. No pulse shorter than 3 cycles of oscillator clock 30 will pass from input line ADDR$_{13}$CLOCK to filter 26 output line AQ[3]. Therefore, filter 26 filters out all pulse widths shorter than three times clock 30 period $T_{OXM}$. Pulse width filter 26 therefore ensures that what appears on its output line is not noise but the synchronizing signal in the following manner. A predetermined number of clock 30 cycles is selected to ensure that a signal appearing on the input to filter 26 is the synchronizing signal and not noise. The synchronizing pulse must appear on the input of filter 26 continuously for that number of clock 30 cycles or else filter 26 will essentially filter it out. A signal appearing on the input to filter 26 will not appear at its output unless that signal is present for the full time period of a predetermined number of clock 30 cycles. For example, if the clock 30 frequency is 32 megahertz, and filter 26 filters out any signal shorter than 3 clock 30 cycles $T_{OXM}$, then it will be assumed that any pulse width shorter than for example 94.5 nanoseconds is noise that is to be ignored. However, it should be understood that practice of the present invention is not limited to use of a 32 megahertz clock, nor is filter 26 limited to a minimum pulse width of 3 clock 30 cycles nor of 94.5 nanoseconds. The minimum passthrough pulse width of filter 26 can be made wider or narrower by adding or subtracting flip-flops to the configuration of FIG. 8 or by changing the frequency of the clock 30 signal applied to that filter. For example, another clock 30 cycle could be added to the minimum pulse width for filter 26 by adding an additional flip-flop AQ4 (not shown) connected in a manner similar to that of flip-flop AQ3 of FIG. 8, except that the signal applied to the D input of additional flip-flop AQ4 would be provided by a 4-input AND gate having inputs from $ADDR_{13}CLOCK$, AQ[1], AQ[2] and AQ[3]. The clock input to flip-flop AQ4 would be provided by the oscillator clock 30 output signal, as is the case with AQ1, AQ2 and AQ3. Further flip-flops AQ5, AQ6, etc. could be added in a similar manner, if and as needed, to the configuration of FIG. 8. Adding flip-flop AQ4 would add another clock cycle Tom of oscillator clock 30 to the minimum pulse width or filter time of filter 26. The output of flip-flop AQ4 could then be used instead of AQ[3] (the output of flip-flop AQ3) as the output of filter 26 that would be provided to pulse limiter 32. Another way that the filter constant of pulse width filter 26 could be changed would be to change the clock signal provided to filter 26.

Figure 9:
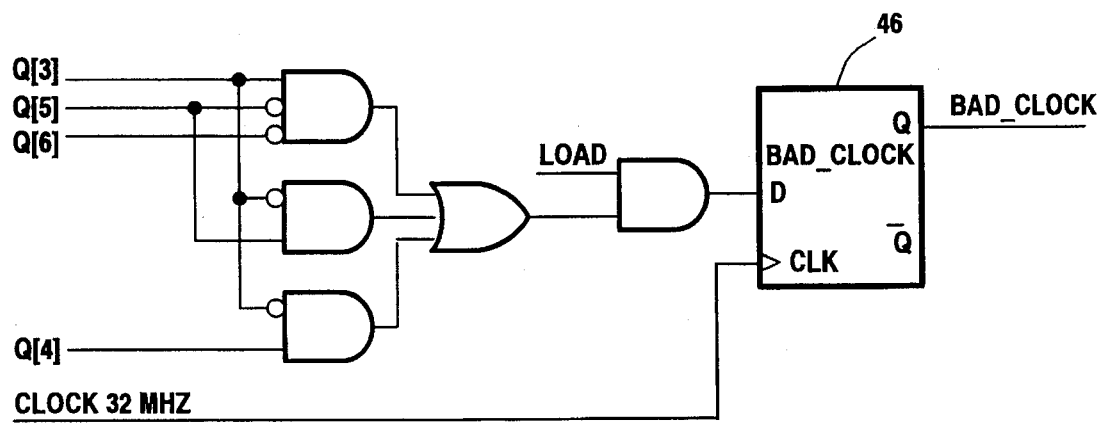
FIG. 9 is a schematic diagram of one embodiment of a tolerance error detector for the error compare component of the synchronized module of FIG. 4.

One configuration of error compare or tolerance error detector 38 is illustrated in FIG. 9. For the configuration of FIG. 9, inputs Q[3], Q[4], Q[5] and Q[6] are the correspondingly identified signals produced by the system of FIG. 5A. As discussed above, FIG. 5A illustrates a portion of one configuration of counter/divider 28. As in FIG. 5A, the LOAD input to the system of FIG. 9 is provided by the LOAD output of the pulse limiter of FIG. 7. The remaining input, for the clock input of flip-flop 46, is provided by the output of oscillator clock 30. The Q output of the BAD CLOCK flip-flop 46 becomes active, and presence of a clock 30 error is thereby indicated, when this counter/divider is resynchronized and is out of synchronization with common module 12 clock 42 by at least plus or minus 3 clock cycles $T_{OXM}$ or plus or minus 94.5 nanoseconds. The Q output of flip-flop 46, identified in FIG. 9 as output $BAD_{13}CLOCK$, is provided as the clock error output 40 of error compare or tolerance error detector 38 of FIG. 4. When a synchronization pulse is received by a synchronized module 14 from common module 12 via connection 16, if clock 30 in that time frame is within the desired tolerance, then the outputs Q[6], Q[5], Q[4] and Q[3] of the counter of FIG. 5A should have a Table 1 count between 9 and 1, i.e. a count of 9, 10, 11, 0 or 1. If the count appearing on the outputs of the counter of FIG. 5A is outside that range, then at the time that this synchronization pulse occurs, clock 30 is out of tolerance, and flip-flop 46 gets clocked and latches in an error on its output line $BAD_{13}CLOCK$, assuming that the desired tolerance $T_{ERRORMAX}$ is equivalent to the worst case of 3 clock cycles $T_{OXM}$. For a 32 megahertz clock, 3 clock cycles would be 94.5 nanoseconds.

For the foregoing example of a 32 megahertz clock with $T_{ERRORMAX}$ of 3 times one such clock period, and with a range given for the period of the synchronization pulse of 2.25 microseconds to 414 microseconds, then in the expression given above for $T_{MAX}$, $T_{MAX}$ could be set equal to 414 microseconds and the expression solved for $S_{OXM}$ to determine the worst-case acceptable tolerance for the clock oscillator. In this manner, with the circuit parameters given in the above example, a clock tolerance $S_{OXM}$ of 114 parts per million would be acceptable. Therefore in the example, the clock oscillator selected with manufacturer's specification for $S_{OXM}$ at 100 parts per million, is better than it needs to be and can be used in the system of the present invention. Alternatively, the clock used could be less accurate and therefore cheaper, or the time or period between synchronization pulses could be longer if the clock tolerance $S_{OXM}$ is tighter than 100 parts per million.

Alternatively, pulse width filter 26, pulse limiter 32, counter/divider 28 and tolerance error detector 38 could be implemented in Programmable Logic Devices (PLDs) such as the AMD MACH series of parts available from Advanced Micro Devices. The Boolean statements or expressions that would be implemented in such PLDs to provide pulse width filter 26, pulse limiter 32, counter/divider 28 and tolerance error detector 38 are given in Table 2 below.

TABLE 2

DECLARATIONS

INPUT CLOCK,ADDR_CLOCK,START_COUNT,CLR,
NODE LOAD CLOCKED_BY CLOCK RESET_BY CLR;
NODE LOAD_STOP CLOCKED_BY CLOCK, RESET_BY CLR;
NODE Q[3 . . . 6] CLOCKED_BY CLOCK,RESET_BY CLR;
OUTPUT QA CLOCKED_BY CLOCK,RESET_BY CLR;
OUTPUT QB CLOCKED_BY CLOCK,RESET_BY CLR;
OUTPUT QC CLOCKED_BY CLOCK,RESET_BY CLR;
NODE AQ[1 . . . 3] CLOCKED_BY CLOCK,RESET_BY CLR; "PULSE WIDTH FILTER"
OUTPUT BAD_CLOCK CLOCKED_BY CLOCK,RESET_BY CLR;

EQUATIONS

BAD_CLOCK=LOAD*((Q[5]*/Q[3])+(/Q[3]*Q[4])+(Q[3]*/Q[5]*/Q[6])); "ERROR COMPARE"
AQ[1]=ADDR_CLOCK;"ADDR_CLOCK PULSE WIDTH CHECKER, PULSE WIDTH FILTER"
AQ[2]=ADDR_CLOCK*AQ[1];"PULSE WIDTH FILTER"
AQ[3]=ADDR_CLOCK*AQ[1]*AQ[2];"PULSE WIDTH FILTER"
START_COUNT=(AQ[3]+START_COUNT)*/TP_SYNC;"PULSE WIDTH FILTER"
LOAD=AQ[3]*/LOAD*/LOAD_STOP; "RESYNC LOAD, PULSE LIMITER"
LOAD_STOP=LOAD+LOAD_STOP*AQ[3];"PULSE LIMITER"
Q[6]=(/Q[6]*/LOAD)*START_COUNT;"COUNTER"
Q[5]=((/Q[5] * Q[6] + (Q[5] * /Q[6]))*/LOAD*START_COUNT;"COUNTER"
Q[4]=((/Q[3] * /Q[4] * Q[5] * Q[6] + (Q[4] * /Q[5]) + (Q[4] * /Q[6]))*/LOAD)*START_COUNT; "COUNTER"
Q[3]=((Q[3] * /Q[5]) + (Q[3] * /Q[6]) + (Q[4] * Q[5] * Q[6]))*/LOAD*START_COUNT;"COUNTER"

TABLE 2-continued

```
QA+((Q[4] * Q[5]) + (Q[3] * /Q[5] * /Q[6]) +
   (/Q[3] * /Q[4] * /Q[5]) + (/Q[3] * /Q[4] * /Q[6]))
   *START_COUNT;"5.33 MHZ,COUNTER"
QB=((/Q[3] * /Q[4]) + (/Q[3] * /Q[5]))*START_COUNT;"2.66 MHZ COUNTER"
QC=((/QA*/QB*/Q[3]*/Q[4]*/Q[5]*/Q[6]*/QC)+(/QA*/QB*/Q[3]
   */Q[4]*/Q[5]*/Q[6]))+
   (QC*QB*LOAD))*START_COUNT;"1.33 MHZ COUNTER"
```

For ease of explanation, the following discussion will assume that the rising edge 18 and 20 is the synchronizing edge of the synchronizing signal. The explanation for the falling edge case corresponds to that of the rising edge case, except of course that the falling edge instead of the rising edge is so used.

The minimum pulse width $P_{WMIN}$ for the synchronizing signal is the minimum allowable pulse width as measured in FIG. 2 from rising edge 18 to falling edge 22 and/or from rising edge 20 to falling edge 24. This minimum pulse width $P_{WMIN}$ is determined by the following relationship. Each module 14 to be synchronized may or may not include an optional pulse width filter 26, used to exclude noise and to ensure reception of a valid synchronization signal from common module 12. If no pulse width filter 26 is used in modules to be synchronized 14 because the likelihood of noisy or unacceptable synchronizing signal is small, then $P_{WMIN}=T_{OXM}+T_{CNTRSETUP}$, where $T_{OXM}$ is the period of the clock oscillator on a module to be synchronized 14, and $T_{CNTRSETUP}$ is the setup time of the counter/clock divider 28 in the synchronization circuit of the module to be synchronized 14. However, if a module to be synchronized 14 includes the optional pulse width filter 26 to ensure valid synchronization signal from common module 12, then $P_{WMIN}=T_{OXM}+T_{FILTER}$, where $T_{FILTER}$ is the minimum pulse width that the optional pulse width filter 26 of the module to be synchronized 14 will allow to pass. In either case, each synchronizing signal pulse must end at least Ton before the next such pulse begins.

$T_{MAX}$, the maximum allowable time between synchronizing edges of the synchronizing signal produced by con, non module 12 is determined by the following relationship: $T_{MAX}=(T_{ERRORMAX} \times 10^6)/2S_{OXM}$ where $T_{ERRORMAX}$ is the maximum allowable synchronization error in the synchronized clock signal on the module to be synchronized 14. In other words, $T_{ERRORMAX}$ is the maximum allowable synchronization error that the user is allowing by design in the system. $S_{OXM}$ is the frequency tolerance, in parts per million, of the oscillator clock 30 of the module to be synchronized 14; this value is usually specified on the data sheet for the particular oscillator clock being used. $T_{MIN}$, the minimum allowable time between synchronizing edges of the synchronizing signal produced by con, non module 12, is determined by the following relationship: $T_{MIN}=T_{ML}$, where $T_{ML}$ is the clock period of the lowest frequency output clock signal 34 to be synchronized on the modules to be synchronized 14.

$T_{ERRORMAX}$ reflects the accuracy of synchronization. $T_{ERRORMAX}$ must be greater than $T_{OXM}$, the period of the oscillator clock 30 of the module to be synchronized 14. Therefore, the limit of accuracy of the synchronization system 10 is the period of the oscillator clock 30 on the module to be synchronized 14.

Figure 4A:
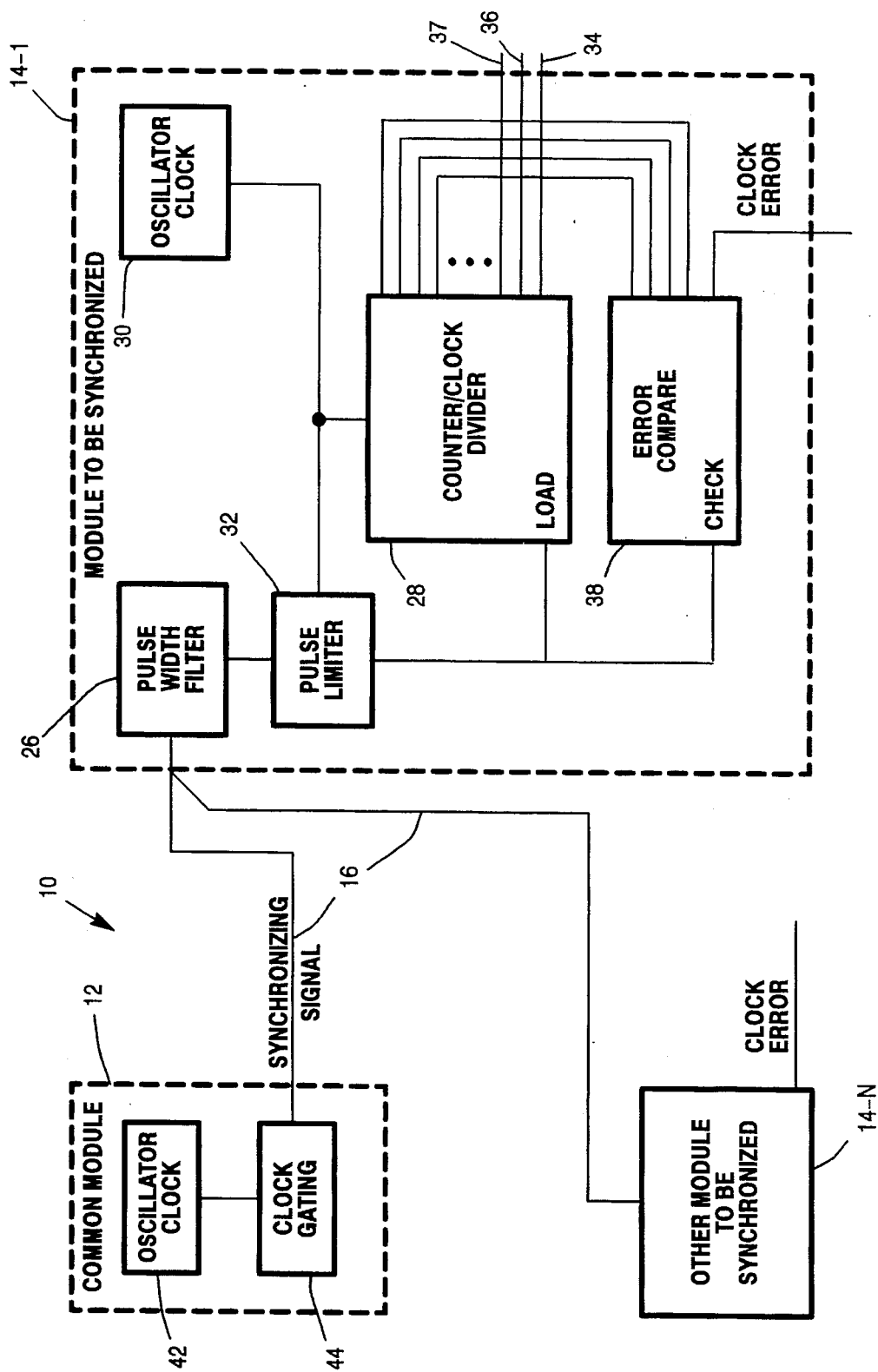
FIG. 4A shows the system of FIG. 1 in greater detail.

Regarding the relationship between tolerance error detection and a non-continuous synchronization signal, in any system there can be established a maximum acceptable level of synchronization error that can occur without system errors or failures. This value is herein referred to as $T_{ERRORMAX}$. The actual value of $T_{ERRORMAX}$ used for any particular application is very system dependent. In the system of FIGS. 3, 4 and 4A, $T_{ERRORMAX}$ is based on the fact that for proper operation, the count on multiple counters on different modules 14 must remain the same for 50% of each counter's clock period. One example of this is shown in Table 3 below.

TABLE 3

| Time | Count Values | | | | | | | |
|---|---|---|---|---|---|---|---|---|
| Counter on Module 14-1 | X | X | X + 1 | X + 1 | X + 1 | X + 1 | X + 2 | X + 2 |
| Counter on Module 14-2 | X | X + 1 | X + 1 | X + 1 | X + 1 | X + 2 | X + 2 | X + 2 |
| Counter on Module 14-(N-1) | X | X | X | X + 1 | X + 1 | X + 1 | X + 1 | X + 2 |
| Counter on Module 14-N | X | X | X + 1 | X + 1 | X + 1 | X + 1 | X + 2 | X + 2 |

In Table 3, the third and seventh columns indicate the points of ideal synchronization. In the example shown in Table 3, the counts must be the same for 50% of the time. If the clocks to the multiple counters 28 were to become out of synchronization more than a period of time equal to 50% of the count time, then the counters 28 would get different counts and would stay off. Therefore, in the system of FIGS. 3 and 4, $T_{ERRORMAX}$ is easily defined. With a known $T_{ERRORMAX}$, the remaining factors can be determined.

$T_{MIN}$ is equal to the lowest frequency clock to be directly synchronized. The clocks to be synchronized are of course known. $T_{MIN}$ is equal to the lowest frequency to be directly synchronized because if the synchronization pulses were closer together than $T_{MIN}$, then the divider circuit 28 would not produce the slowest clock 34 at all or would at least miss cycles. Slower clocks can be indirectly synchronized by dividing the synchronized clocks as discussed earlier.

With $T_{ERRORMAX}$ known, $T_{MAX}$ can be calculated. $T_{MAX}$ is the maximum time period between synchronization pulses that will assure synchronism when the oscillators 30 are operating within tolerance. Therefore, $T_{MAX}$ is the period between synchronization pulses required to correct an oscillator 30 that is within tolerance to the degree that $T_{ERRORMAX}$ is not exceeded. Therefore, $T_{MAX}$ is equal to $(T_{ERRORMAX} \times 10^6)/2S_{OXM}$, where $S_{OXM}$ is the oscillator precision per million. $S_{OXM}$ can for example be obtained from the data sheet for each oscillator 30 being used.

Figure 10:
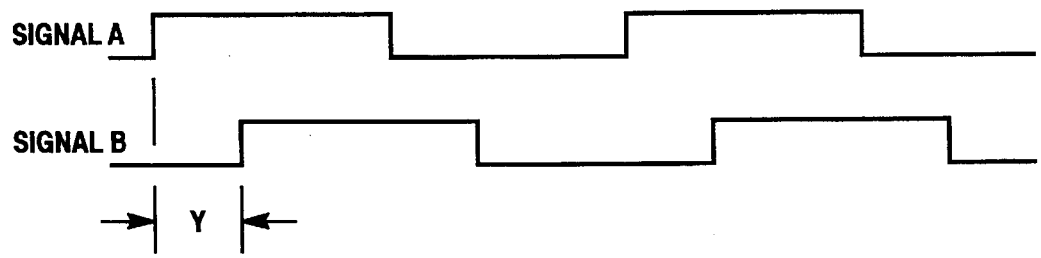
FIG. 10 is a waveform timing diagram showing an illustrative example of two clock output signals to be kept synchronized by the present invention, particularly showing graphically that the difference between like edges of the two synchronized signals cannot exceed $T_{ERRORMAX}$.
Figure 11:
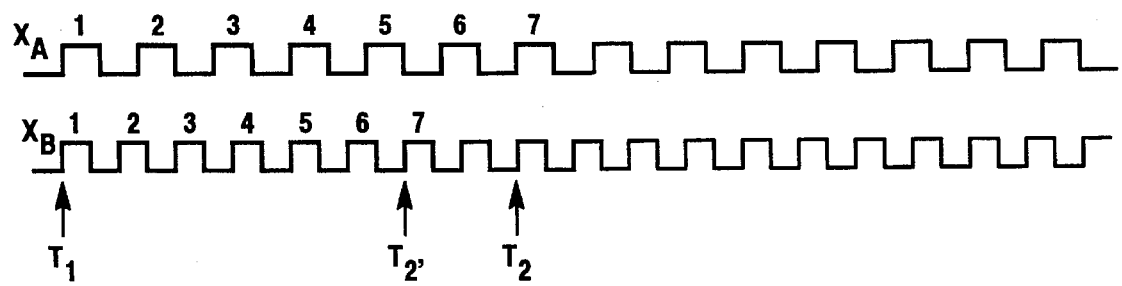
FIG. 11 is a waveform timing diagram showing an illustrative example of two clock output signals to be kept synchronized by the present invention, particularly showing graphically how two such signals skew away from each other because the second signal has a higher frequency than does the first signal, but exaggerated for clarity of illustration.

To look at this another way, suppose an oscillator of frequency X and precision $S_{OXM}$ of 100 PPM (parts per million) were used as an oscillator 30 in the system 10. In such a situation, the possible short term "jitter" is between X plus or minus $(X \times S_{OXM})/10^6$ or X plus or minus $((X/10^6) \times 100)$. For example, if X=32 MHz then the range would be 31,996,800 to 32,003,200. If $T_{ERRORMAX}$ is a known value, then the difference Y between like edges of the synchronized signal cannot exceed $T_{ERRORMAX}$. A graphical example is shown in FIG. 10. The worst case situation is when the clocks of frequency X are at the opposite edges of their tolerance at the same time. For example, if the signals A and B of FIG. 10 are respectively generated by clock $X_A$ and clock $X_B$, then following the previous example where X=32 MHz, then $X_A$=31,996,800 and $X_B$=32,003,200. Now assuming the signals A and B of FIG. 10 start synchronized to each other to within a single cycle of their respective $X_A$ or $X_B$, it is next determined how long it takes for the signals A and B to go out of synchronism by $T_{ERRORMAX}$ assuming no synchronization pulses are provided. Note that $T_A$ and $T_B$ are the respective periods of clocks $X_A$ and $X_B$. Thus, $T_A=1/X_A$ and $T_B=1/X_B$. For this example, it is thus found that $T^A$=31.2531253 nanoseconds, and $T_B$=31.2468753 nanoseconds. As each time $T_A$ and $T_B$ advances, the signals A and B skew away from each other because $X_B$ is going faster than $X_A$, as shown in FIG. 11 graphically but exaggerated for clarity. In FIG. 11, at time $T_1$, $X_A$ and $X_B$ are synchronized. At time $T_2$, $X_A$ is on its seventh pulse, but $X_B$ is on its ninth pulse. The error buildup is therefore the difference in time between like pulses. For this example, the error buildup is the difference between the seventh pulse of $X_A$ to the seventh pulse of $X_B$, or the delta between $T_2$ and $T_2$. prime. If $X_A$ were to oscillate for one second, then $X_A$ would have produced 31,996,800 cycles. It would only take $X_B$ a time of $T_B \times (31,996,800)$ or 0.9998000 seconds to produce the same number of cycles. Therefore, the error or delta between $X_A$ and $X_B$ for one second is 200 microseconds. This error or delta between $X_A$ and $X_B$ can be calculated for any number of elapsed pulses. The total error per second is $((2S_{OXM})/10^6)$ seconds independent of the frequency X of the oscillator 30. As used and is usually given, $S_{OXM}$ is in parts per million (PPM). Because $S_{OXM}$ is in reference to frequency, parts per million is hertz per megahertz. The maximum error for one clock 30 output signal after one second of elapsed time is $(S_{OXM}$ hertz/MHz$) \times (1$ second/second$)=(S_{OXM}/10^6) \times (1$ second/second$)=S_{OXM} \times 10^{-6}$ (seconds/seconds). The total error for two or more signals=$2S_{OXM} \times 10^{-6}$ (seconds/seconds) because the error for individual signals in the worst case can be in opposite directions. Therefore, in a system with two or more clock 30 output signals, the total error is $2S_{OXM} \times 10^{-6}$ (seconds/seconds). In order to assure that the error in a synchronized system does not exceed $T_{ERRORMAX}$, the system must be resynchronized sufficiently often enough to assure that the error buildup at the rate of $2S_{OXM} \times 10^{-6}$ (seconds/seconds) does not exceed $T_{ERRORMAX}$. Therefore, $T_{MAX}$, which is the maximum time allowable between synchronization pulses, is the amount of time where $T_{ERRORMAX}$ is set equal to the total error or $T_{ERRORMAX}$ (seconds) =$2S_{OXM} \times 10^{-6}$ (seconds/seconds)$\times T_{MAX}$ (seconds)= $2S_{OXM} T_{MAX} 10^{-6}$ (seconds). Thus $T_{MAX}$ (seconds)= $T_{ERRORMAX} \times (10^6/2S_{OXM})$ seconds=$(T_{ERRORMAX} \times 10^6)/(2S_{OXM})$. Therefore, if $T_{ERRORMAX}$=94 nanoseconds and $S_{OXM}$32 100 PPM, then $T_{MAX}$=(94 ns$\times 10^6$)/((2)(100))=470 microseconds.

Now that $T_{MAX}$ and $T_{MIN}$ have been determined for this example, the factors involved in synchronizing multiple clocks on multiple modules can be considered. As shown in FIG. 1, the modules 14 to be synchronized use a common signal from common module 12 for synchronization. It is preferable that a special signal not be required for this purpose, to avoid additional cabling or additional signals on a bus. Flexibility of this synchronization signal is desirable, particularly for that reason. Synchronization system 10 assures that the synchronized signals that it produces are within $T_{ERRORMAX}$ of each other. If system 10 resynchronized the output signals at intervals of no less than $T_{MIN}$ continuously (which is not required), not only do the output signals remain within $T_{ERRORMAX}$, but they furthermore well surpass that constraint. As a result, even if the initial calculation of $T_{ERRORMAX}$ was incorrect, this extra synchronization may allow system 10 to operate correctly anyway. If alternatively $T_{ERRORMAX}$ had been correctly calculated, system 10 would be affected less by an oscillator 30 if out of tolerance.

$T_{MAX}$ is the maximum time period between synchronization pulses that will assure that the signals produced by clocks 30 remain within $T_{ERRORMAX}$ assuming that the oscillators 30 are operating within tolerance. However, if the synchronization pulses occur at intervals of $T_{MAX}$ continuously, then as soon as an oscillator 30 would become out of tolerance, the system 10 would fail to synchronize the clock 30 signals to within $T_{ERRORMAX}$.

Figure 12:
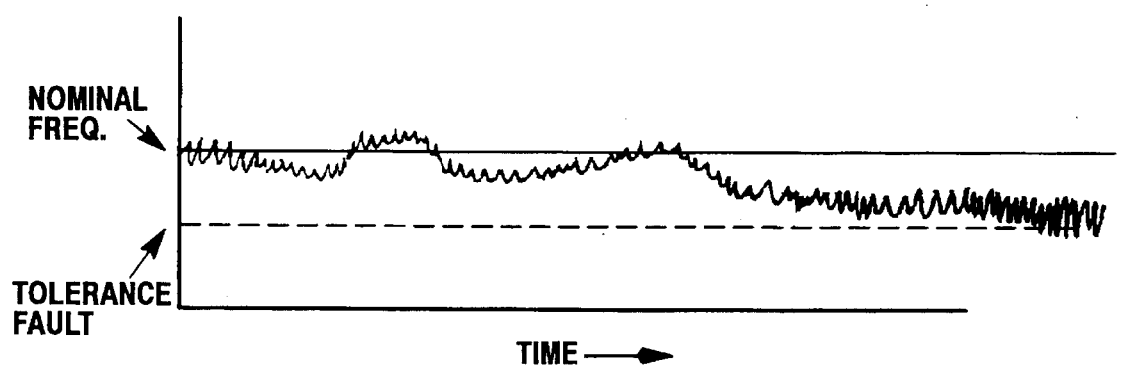
FIG. 12 is a waveform timing diagram showing an illustrative example of a clock output signal, particularly showing graphically how both change in long term average clock frequency, and short term variations, can cause the clock signal to exceed the tolerance fault level of $T_{ERROMAX}$, but that the latter is more likely to cause such a failure first.
Figure 13:
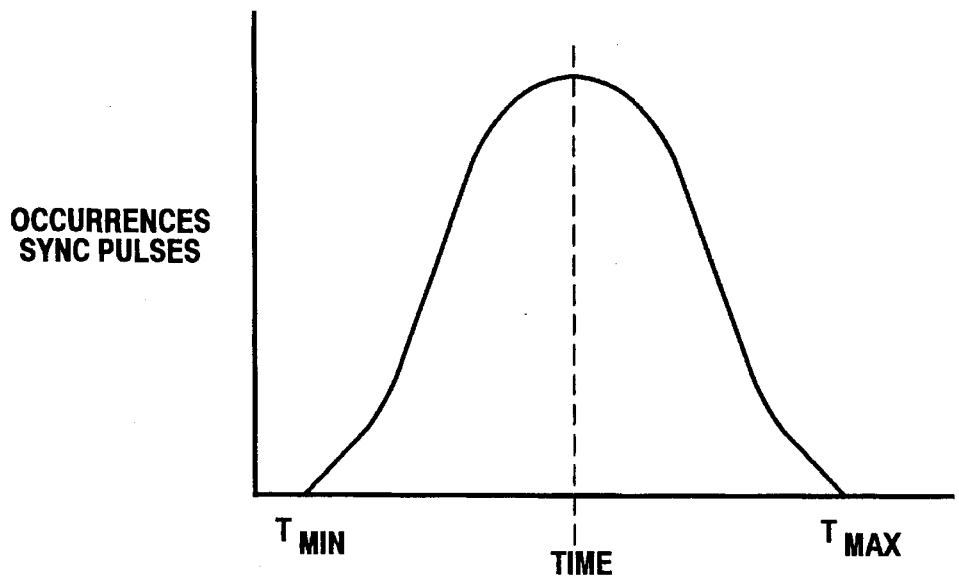
FIG. 13 is a plot of occurrences of synchronization pulses over time on a Gaussian curve.

Oscillators typically used in most digital applications are quartz crystal-controlled. Such oscillators have two types of variation in frequency characteristics: change in the long term average frequency, and short term variations that can be characterized as jitter. Either of these variations can cause a clock 30 output signal to exceed $T_{ERRORMAX}$, but jitter is more likely to cause such a failure first. This phenomenon is illustrated in FIG. 12. In FIG. 12, the actual frequency is shown as varying from the intended, nominal frequency. Although change in long term average frequency can cause the permitted tolerance of $T_{ERRORMAX}$ to be exceeded, as shown in FIG. 12 the first failure occurs as jitter passes the tolerance fault level. Provision in the present invention of a tolerance error detector 38 permits failure detection and isolation. Also, when jitter causes a failure, system 10 operation can continue because the system will resynchronize and the tolerance error detector output can be used to disregard the failed process and repeat it. This is especially useful in data communications. Furthermore, if a system were developed that allowed the synchronization pulse to vary from $T_{MAX}$ to $T_{MIN}$, then some of the benefits of $T_{MIN}$ are recovered. It can be expected that in a system where a synchronization pulse varies between $T_{MAX}$ and $T_{MIN}$, there will be some distribution between $T_{MAX}$ and $T_{MIN}$ that the actual synchronization signal produced will follow. As shown in FIG. 13, a Gaussian distribution can apply. FIG. 13 is a plot of occurrences of synchronization pulses over time on a Gaussian or bell curve. If synchronization pulses occur at a frequency of $T_{MIN}$, then system 10 will have the ability to correct some degree of out of tolerance oscillators 30. However, if synchronization pulses occur at intervals of $T_{MAX}$ or longer, then out of tolerance oscillators 30 would fail. If in system 10 synchronization pulses occur on an average of $(T_{MIN}+T_{MAX})/2$, then on average such a repetition of synchronization pulses allows oscillators 30 to become out of tolerance somewhat. If an out of tolerance oscillator 30 causes system 10 failure when synchronization pulses occur at intervals of $T_{MAX}$, both jitter and this distribution of synchronization pulses allow system 10 to recover as long as the tolerance error detector can be used to eliminate bad data at the time of the short term period when the tolerance level of $T_{ERRORMAX}$ was exceeded. The number of tolerance errors can be monitored by a suitable counter and a decision made as to when to replace each oscillator 30. This allows system 10 to be maintained off line without affecting operation except for a small amount of degradation if tolerance errors occur. Thus, system 10 allows a large degree of fault tolerance similar to that which would occur if synchronization pulses would be produced at intervals of $T_{MIN}$ continuously, yet provides the additional benefits of a flexible synchronization signal, failure detection, failure isolation, failure recovery for most failures, and off line maintenance. Use of a flexible synchronization signal means that no additional hardware is needed to generate the synchronization signal, no additional signal lines are required in cabling or bus to handle the signal, and multiple uses for the same signal are allowed. Also, system 10 can indicate if an intermittent failure occurs, for ease of troubleshooting.

Some of the many advantages of the invention should now be readily apparent. For example, a novel synchronizer and synchronization method with tolerance fault detection have been provided which are capable of generating one or more periodic signals and are furthermore capable of synchronizing one or more digital clock signals, each generated by separate oscillators on one or more separate modules, to another clock oscillator. Apparatus and method have been provided which are capable of synchronizing one or more digital clock signals, generated by separate oscillators, on one or more separate modules with identical synchronization circuits, to another clock oscillator with a common non-continuous signal. Additionally, the present apparatus and method provide one or more error signals to indicate when one or more oscillators are out of tolerance. The present invention allows clock signal synchronization in circuits in completely separate modules without requiring a special synchronizing signal. Additionally, the apparatus of the present invention can be combined with a clock divider circuit or other component(s) already present on a module, thereby reducing the amount of additional circuitry required for synchronization. A non-continuous signal is used as a synchronizing signal. Apparatus and method are provided for tolerance error detection. Synchronization and clock divider circuits are combined, to reduce the total amount of circuitry needed. As a result, fewer total components are required for clock generation and synchronization, less cabling is required between modules because of the use of pre-existing signals, and a predictable, higher accuracy of synchronization is provided. In the present invention, a non-continuous reference pulse, rather than a separate, continuous clock signal, is utilized as the reference signal to synchronize one or more units.

The present invention is capable of both synchronizing and synthesizing multiple related output clocks and keeps them synchronized from one module to the next, without necessarily outputting a given constant frequency. A counter or divider is used to provide both the clock dividing and clock synchronizing functions. The present invention uses a synchronizing pulse that is non-continuous and is related by only the frequency of the clock used to generate one edge of the synchronizing pulse. Therefore, the period and duty cycle of the synchronizing pulse can very greatly without affecting operation of the circuit. The present invention relies on all modules to be synchronized receiving the same synchronization pulse, and not on the characteristics of that pulse. Additionally, the synchronization pulse signal line can be optionally filtered to prevent a noise pulse from being misinterpreted as a real synchronization pulse. The duty cycle and period of the synchronizing pulse are easily varied from one period to the next without affected circuit operation. The clock error signal from the tolerance fault detector is a fault signal to indicate that one or more of the oscillator clocks is so far out of tolerance that the error cannot be corrected without missing an output clock cycle or exceeding the preset allowable tolerance fault level.

One practical application of the present invention is in computers. For example, a mother board with multiple daughter boards, such as a personal computer, could have the clocks on each of the daughter boards synchronized together by using a pre-existing mother board signal such as Address Latch Enable (ALE) as the synchronizing signal.

The present invention requires that the synchronizing pulse has one edge generated from a clock signal equal to the oscillator frequency of each module to be synchronized, yet the signal need not be continuous or of constant pulse width. This flexibility allows use of a pre-existing signal as a synchronizing pulse. Also, a pulse limiter can be employed to truncate the end of the synchronizing pulse without disturbing the leading edge if used for synchronization (or vice versa). This allows the system to synchronize with improved accuracy.

The present invention uses a synchronous counter as the clock divider, but need not use a divisor evenly divided by two. An example of such a counter is shown in FIGS. 5A and 5B. These differences not only increase accuracy but also allow operation at much higher clock frequencies. For example, the local oscillator clock 30 frequency could easily be high enough that the delay in ripple (divide-by-two) counter stages of Meacham would be longer than its clock period, so that the present invention could operate at frequencies higher than could be tolerated by Meacham. The optional filter can be used to eliminate unwanted noise. Shorter tolerance fault errors in the local oscillators can now be detected by the present invention. The present invention provides an approach to synchronizing by use of reset (or load to a specified value) of a counter that can operate at high frequencies, provide more accurate synchronization, does not require a special synchronizing pulse, is capable of filtering synchronizing pulse noises, and provides an error indication when one or more oscillators are out of tolerance enough to prevent the circuit from synchronizing the clocks on multiple modules to within the specified tolerance. However, the present invention does not require that the counter or divider be reset or clear; a load to a known value is equally acceptable. A proper synchronization pulse is applied for the counter to re-initialize. No preset interval between synchronization pulses is required. The present invention allows the synchronization pulse to vary in period and duty cycle. Additionally, the present invention provides an error warning signal to indicate when a clock oscillator being synchronized is out of tolerance. The present invention is capable of synchronizing multiple clocks on multiple modules from a synchronization pulse that is not required to be a dedicated synchronization signal. Multiple phase clocks on multiple modules that have separate oscillators can be synchronized to each other thereby. There is no need to save a control signal to resynchronize the system after power up because at the power up the output signals are thereupon or shortly thereafter synchronized by the first received synchronization pulse. The present invention is capable of synchronizing a distributed system, and furthermore provides an error indicator signal when one or more module oscillators being synchronized thereby is out of tolerance.

Obviously, many modifications and variations of the present invention are possible enlight of the above teachings. It is therefore understood that the foregoing embodiments are presented by way of example only and that, within the scope of the appended claims and equivalents thereto, the invention may be practiced otherwise than as specifically described.

What is claimed is:

1. Apparatus for producing a synchronized clock signal, comprising:

synchronizing means for generating a synchronization signal;

clock means for generating a periodic clock signal having a period;

limiting means, receiving the synchronization signal and the periodic clock signal, for producing a plurality of synchronization pulses similar to the synchronization signal but no longer than one period of the periodic clock signal;

counting means, responsive to the synchronization pulses and the periodic clock signal, for producing at least one synchronized clock signal; and fault detection means for comparing the synchronization pulses with at least one synchronized clock signal and producing an error signal indicative of whether an edge of at least one synchronized clock signal varies from an edge of one of the synchronization pulses by more than a preset tolerance.

2. Apparatus as defined in claim 1, further comprising:

means for adjusting the preset tolerance of said fault detection means.

3. Apparatus for producing synchronized clock signals, comprising:

synchronizing means for generating a synchronization signal; and a plurality of modules, each of said modules receiving the synchronization signal, each of said modules respectively comprising:

clock means for generating a periodic clock signal having a period;

limiting means, receiving the synchronization signal and the periodic clock signal, for producing a plurality of synchronization pulses similar to the synchronization signal but no longer than one period of the periodic clock signal;

counting means, responsive to the synchronization pulses and the periodic clock signal, for producing at least one synchronized clock signal; and fault detection means for comparing the synchronization pulses with at least one synchronized clock signal and producing an error signal indicative of whether an edge of at least one synchronized clock signal varies from an edge of one of the synchronization pulses by more than a preset tolerance, whereby said plurality of modules utilize said synchronizing means as a common synchronizing means, and whereby said plurality of modules generate at least a like plurality of synchronized clock signals each held within a respective preset tolerance of the respective fault detection means.

4. Apparatus as defined in claim 3 wherein each of said modules further comprises a respective means for adjusting the respective preset tolerance.

5. A method for producing a synchronized clock signal, comprising the steps of:

generating a synchronization signal;

generating a periodic clock signal having a period;

in response to the synchronization signal and the periodic clock signal, producing a plurality of synchronization pulses similar to the synchronization signal but no longer than one period of the periodic clock signal;

in response to the synchronization pulses and the periodic clock signal, producing at least one synchronized clock signal; and comparing the synchronization pulses with at least one synchronized clock signal and producing an error signal indicative of whether an edge of at least one synchronized clock signal varies from an edge of one of the synchronization pulses by more than a preset tolerance.

6. A method as defined in claim 5 wherein the preset tolerance is adjustable.

7. A method for producing a synchronized clock signal, comprising the steps of:

generating a synchronization signal;

generating a first plurality of periodic clock signals each having a respective period;

in response to the synchronization signal and the periodic clock signals, producing a second plurality of synchronization pulses similar to the synchronization signal but no longer than one period of a said periodic clock signal, wherein the second plurality is greater than the first plurality;

in response to the synchronization pulses and the periodic clock signals, producing at least a first plurality of synchronized clock signals; and comparing the synchronization pulses with at least one synchronized clock signal and producing an error signal indicative of whether an edge of at least one synchronized clock signal varies from an edge of one of the synchronization pulses by more than a preset tolerance.

8. A method as defined in claim 7 wherein:

the second plurality is an integral multiple of the first plurality such that the second plurality of synchronization pulses comprises a number, equal to said multiple, of first pluralities of the synchronization pulses; and each of the first pluralities of synchronization pulses is no longer than one period of a respective one of the first plurality of clock signals.

9. A method as defined in claim 8 wherein the preset tolerance is adjustable.

10. A method as defined in claim 7 wherein the preset tolerance is adjustable.

11. Apparatus for producing a synchronized clock signal, comprising:

synchronizing means for generating a synchronization signal;

clock means for generating a periodic clock signal having a period;

limiting means, receiving the synchronization signal and the periodic clock signal, for producing a plurality of synchronization pulses similar to the synchronization signal but no longer than one period of the periodic clock signal;

counting means, responsive to the synchronization pulses and the periodic clock signal, for producing at least one synchronized clock signal; and fault detection means for comparing the synchronization pulses with at least one synchronized clock signal and producing an error signal indicative of whether an edge of at least one synchronized clock signal varies from an edge of one of the synchronization pulses by more than an adjustable tolerance.

12. A method for producing a synchronized clock signal, comprising the steps of:

generating a synchronization signal;

generating a periodic clock signal having a period;

in response to the synchronization signal and the periodic clock signal, producing a plurality of synchronization pulses similar to the synchronization signal but no longer than one period of the periodic clock signal;

in response to the synchronization pulses and the periodic clock signal, producing at least one synchronized clock signal; and comparing the synchronization pulses with at least one synchronized clock signal and producing an error signal indicative of whether an edge of at least one synchronized clock signal varies from an edge of one of the synchronization pulses by more than an adjustable tolerance.

* * * * *